Patented Dec. 17, 1940

2,225,262

UNITED STATES PATENT OFFICE 2,225,262

WOOD FILLER

Joseph B. Dietz, Roanoke, Va., and Edmund F. Oeffinger, Milltown, N. J., assignors to E. I. du Pont de Nemours & Company, Wilmington, Del., a corporation of Delaware No Drawing. Application May 23, 1939, Serial No. 275,268

2 Claims. (Cl. 260—22)

This invention relates to compositions useful in the wood finishing art, and more particularly to new and improved wood finishing fillers.

Conventional treatment in the finishing of wood includes successive application of the stain, a wood filler, a sanding sealer and the final finishing coat. This invention is concerned with the wood filler composition. The wood fillers used in the present state of the art commonly prepared from a raw or treated drying oil as linseed oil, volatile solvent or diluent, Japan driers, fillers or extenders as siliceous materials or organic materials as cornstarch, wood flour, etc., and where desirable or necessary pigments or dyes to shade. The filler is usually applied by brushing or spraying to the previously sanded and smoothed wood surface and the brushed or sprayed material allowed to dry until most of the easily volatile constituents have evaporated. The coated surface is then suitably rubbed by which means the filler is worked into the pores of the wood. Any excess filler is removed from the surface and the surface smoothed. The treated wood is then allowed to dry after which other finishing materials are applied. The air drying time commonly required for satisfactory drying, that is before additional finishing compositions may be applied, is in the neighborhood of 24 hours. This drying time is longer than desirable for practical purposes, particularly where large scale production is practiced. The present type of fillers are also not entirely satisfactory in that they are sensitive to the solvents, thinners and diluents used in subsequent coatings or finishing compositions. This sensitivity manifests itself in the swelling of the filler by the above mentioned solvents, etc., and produces a roughened surface rather than the desirable smooth surface. This phenomenon is technically known in the wood finishing industry as "puffing."

An object of the present invention is therefore the preparation of a wood filler which dries more rapidly than the present conventional type of fillers. Another object is the preparation of a wood filler which is not affected by the solvents, thinners, etc., contained in the finishing compositions subsequently applied. A still further object is the preparation of a wood filler which is easily prepared from readily available materials and is economically practical for use in large scale production of wood finishing. Other objects will be apparent as the description of the invention proceeds.

The above objects are accomplished by formulating a wood finishing composition from ingredients comprising as the vehicle a polyhydric alcohol-polybasic acid resin modified with substantial amount of drying oil, and a suitable filler in relatively large amount as compared to the amount of the mentioned resinous vehicle, together with driers and liquid ingredients.

The vehicle is a polyhydric alcohol-polybasic acid resin containing in combined form substantial amount of drying oil, this amount preferably being from 50 to 80%. These oil modified resins are made by reacting by heat treatment a polyhydric alcohol, a polybasic acid resin, and the acids obtained from a drying oil, or they may be made from the drying oil itself by first reacting the oil with glycerol and then reacting the mono- or diglyceride of the oil acid thus obtained with the polybasic acid. This resinous vehicle is used in the proportion of about 4 parts to 9 parts filler for one part vehicle.

The following examples, in which the parts are by weight, are illustrative of the best methods for carrying out our invention:

Example I

| | Parts |
|---|---|
| Oil modified polyhydric alcohol-polycarboxylic acid resin | 11.7 |
| Heavy petroleum naphtha | 3.5 |
| Asbestine | 10.5 |
| Silex silica | 65.7 |
| Lead-manganese liquid drier | 4.2 |
| Pigment (dispersed in vehicle) | 3.9 |
| Water | .5 |

The oil modified polyhydric alcohol-polycarboxylic acid resin used in this example was a 70% perilla oil modified glyceryl phthalate.

A suitable procedure for preparing the composition comprises placing all the ingredients, with the exception of the water, in a standard paint mixer and thoroughly agitating until a homogeneous mixture is obtained. The water is then added and the mixing continued for approximately 15 minutes. The water increases the body of the mass to the proper consistency. A suitable type of mixer for the purpose is such known as a Pony mixer.

The lead-manganese drier solution was a 32% solution of a Japan type drier dispersed in mineral spirits and contained 4.77% of lead and 1.42% of manganese based on the total weight of the drier.

The pigment used was dispersed in raw linseed oil in a ratio of approximately 55% pigment and 45% oil.

Example II

| | Parts |
|---|---|
| Oil modified polyhydric alcohol-polycarboxylic acid resin | 15.0 |
| Heavy petroleum naphtha | 4.0 |
| Asbestine | 10.0 |
| Silex silica | 65.7 |
| Lead-manganese liquid drier | 3.0 |
| Pigment (dispersed in vehicle) | 1.5 |
| Water | .8 |

The oil modified polyhydric alcohol-polycarboxylic acid resin was a 70% linseed oil modified glyceryl phthalate.

This composition may be prepared in a manner similar to that described under Example I or by any other suitable procedure which includes adding the water after a preliminary mixing of the other ingredients.

While the examples disclose the use of a 70% perilla oil modified glyceryl phthalate and a 70% linseed oil modified glyceryl phthalate, other fatty oil or fatty oil acid modified polyhydric alcohol-polycarboxylic acid resins such as 62% soya bean oil, 55% castor oil, 60% coconut oil, 62% linseed oil, 35% perilla oil, etc., modified glyceryl phthalate may be used.

In place of the fillers used in the examples other fillers of a siliceous nature, readily available on the open market, may be used. Other useful fillers are talc, clay, etc. These materials may be used alone or in combination in quantity constituting the total filler or extender of the composition. The amount of siliceous filler used, based on the total ingredients of the composition, is from 30 to 80%, the quantity range of the resin on this basis being from 5-30%. The choice of extender or filler or combination thereof may be governed by the use to which the composition is to be applied, economic considerations, availability of materials, etc., and will readily be apparent to those skilled in the art.

The use of pigments will depend on whether or not it is desired to prepare a shaded composition and the amount used will depend on the depth of shade required. As pigments for the shaded compositions burnt and raw umber, burnt and raw sienna, Van Dyke brown and drop black have been found suitable. These pigments will produce the darker shades. For lighter or other shades white and/or other colors may be used. The pigments may be conveniently dispersed in linseed oil or in a suitable alkyd resin vehicle. They are preferably used in this dispersed condition when preparing the filler composition. Japan colors, well known in the art, may also be used. If desired, oil soluble dyes may be used in place of the pigments. To obtain special effects from the filler composition this latter procedure is often desirable.

The heavy petroleum naphtha may be replaced in whole or in part by other hydrocarbon solvents as toluol, xylol, kerosene, mineral spirits, V. M. and P. naphtha, etc. The so-called working qualities of the filler composition will be governed somewhat by the solvent used and the result desired in this connection will govern the particular solvent selected for the composition.

In addition to the lead-manganese drier, other driers as cobalt preferably in the form of linoleates, resinates or naphthenates may be used. In fact, any soluble organo-metallic compound serving the function of a drier in compositions of the present type may be used.

The presence of water aids in reducing the hard settling in the container in which the material may be stored and also after the filler composition is thinned for use. When water is included for these purposes it should be present in amount of from 0.5% to 5.0%, based on the total quantity of ingredients.

The compositions described herein, are applicable for all types of wood finishing where fillers are used as for example in the finishing of furniture, cabinets of various types, floors, etc. The filler compositions are best applied in a consistency as is obtained by thinning from 8 to 14 pounds of the composition with one gallon of solvent or thinner which is preferably V. M. and P. naphtha or a suitable mixture of V. M. and P. naphtha and mineral spirits. Other suitable solvents or thinners may also be used.

An outstanding advantage of this invention in the art of wood finishing is the marked reduction or practical elimination of "puffing" due to the high resistance of our new filler composition to the previously mentioned roughening action of the thinners used in the coatings following the application of the filler composition. Another valuable advantage of this invention is the unusually short drying time of the filler after application to the wood and rubbing before other finishing coats can be satisfactorily applied. The usual time required for the conventional type of fillers is 24 hours (air dry) while the time required for the compositions herein is approximately 8 hours. In forced drying operations at elevated temperatures (e. g. 110° F. to 140° F.) similar proportionate reductions in drying time at any given temperature are effected. The economic advantage in this decrease in time, particularly when applied to large scale production is readily apparent. Further, the present compositions compare favorably in cost of manufacture with the present types of fillers used. They are also economical and simple to use. Other advantages will readily be apparent to those skilled in the art of using wood filler compositions.

As many apparently widely different embodiments of this invention may be made without departing from the spirit and scope thereof, it is to be understood that we do not limit ourselves to the specific embodiments thereof except as defined in the appended claims.

We claim:

1. A wood finishing filler consisting essentially of a polyhydric alcohol-polybasic acid resin modified with 50–80% drying oil, a siliceous filler in amount of from 4 parts to 9 parts filler for each part of said resin, solvent and a drier.

2. A wood finishing filler consisting essentially of a polyhydric alcohol-polybasic acid resin modified with 50–80% drying oil, a siliceous filler in amount of from 4 parts to 9 parts filler for each part of said resin, water in amount of 0.5% to 5% based on the total quantity of ingredients, solvent and a drier.

JOSEPH B. DIETZ.
EDMUND F. OEFFINGER.